(12) United States Patent
Kamizato (10) Patent No.: US 11,923,742 B2
(45) Date of Patent: Mar. 5, 2024

(54) MOTOR

(71) Applicant: Nidec Corporation, Kyoto (JP)

(72) Inventor: Ryo Kamizato, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 208 days.

(21) Appl. No.: 17/667,573

(22) Filed: Feb. 9, 2022

(65) Prior Publication Data

US 2022/0271598 A1  Aug. 25, 2022

(30) Foreign Application Priority Data

Feb. 19, 2021 (JP) .................. 2021-025474

(51) Int. Cl.
*H02K 3/50* (2006.01)
*H02K 3/52* (2006.01)
*H02K 5/22* (2006.01)
*H02K 11/215* (2016.01)
*H02K 29/06* (2006.01)

(52) U.S. Cl.
CPC .................. *H02K 3/50* (2013.01); *H02K 3/52* (2013.01); *H02K 5/225* (2013.01); *H02K 11/215* (2016.01); *H02K 29/06* (2013.01); *H02K 2203/09* (2013.01)

(58) Field of Classification Search
CPC ........ H02K 11/21; H02K 11/215; H02K 3/50; H02K 3/52; H02K 3/28; H02K 29/06; H02K 5/225; H02K 2203/09; H02K 3/46; H02K 11/30; H02K 11/33; H02K 3/522; H02K 5/00; H02K 5/04; H02K 5/06; H02K 5/08

USPC ....................................... 310/71, 89
See application file for complete search history.

(56) References Cited

U.S. PATENT DOCUMENTS

| | | | |
|---|---|---|---|
| 2008/0017439 A1* | 1/2008 | Sawada ................ | B62D 5/0484 180/446 |
| 2016/0352189 A1* | 12/2016 | Yamada ................. | H02K 5/225 |
| 2018/0115224 A1* | 4/2018 | Yamashita ........... | H02K 11/215 |

FOREIGN PATENT DOCUMENTS

JP       5931903 B2    6/2016

* cited by examiner

Primary Examiner — Alexander A Singh
(74) Attorney, Agent, or Firm — Keating & Bennett, LLP (57) ABSTRACT

A motor includes a drive source assembly including a first wiring, a rotation detector including a second wiring, and a motor housing. The motor housing includes a first motor housing that accommodates at least a portion of the drive source assembly, and a second motor housing that accommodates at least a portion of the rotation detector. The first motor housing includes a first penetration portion that radially penetrates the circumferential wall portion of the first motor housing and is open to one axial side, and the second motor housing includes a second penetration portion that radially penetrates the circumferential wall portion of the second motor housing and is open to another axial side. The first wiring is lead out to the outside of the first motor housing via the first penetration portion, and the second wiring is lead out to the outside of the second motor housing via the second penetration portion.

15 Claims, 9 Drawing Sheets

Fig. 9 ly of a first wiring support of an example embodiment of the present disclosure.

MOTOR

CROSS-REFERENCE TO RELATED APPLICATIONS

The present application claims priority under 35 U.S.C. § 119 to Japanese Patent Application No. 2021-025474, filed on Feb. 19, 2021, the entire contents of which are hereby incorporated herein by reference.

1. FIELD OF THE INVENTION

The present disclosure relates to a motor.

2. BACKGROUND

For example, a motor is conventionally known in which two types of wiring, that is, a power line that is a power supply line for connecting a coil wire to the outside and a resolver signal line for detecting a rotational position of a motor, are lead out and extend in substantially the same direction toward the outside of a motor housing.

In the motor as described above, the locations from which the power line and the resolver signal line are lead out the motor housing are often limited. In addition, the cap-side motor housing has a complicated shape, and has a structure in which the wiring accommodated in the motor housing and guided to the lead-out place is likely to be complicated, and a structure in which a member for holding the wiring is also likely to be complicated, which increases manufacturing cost. Therefore, a structure in which the lead-out of the wiring is simplified has been required.

SUMMARY

An example embodiment of a motor of the present disclosure includes a rotor rotatable about a center axis, a stator including coils and radially opposing the rotor, a drive source assembly including a first wiring electrically connected to the coil, a rotation detector including a rotation sensor capable of detecting rotation of the rotor and a second wiring electrically connected to the rotation sensor, and a motor housing that accommodates the rotor, the stator, the drive source assembly, and the rotation detector therein. The motor housing includes a tubular first motor housing that is open to one axial side and accommodates at least a portion of the drive source assembly, and a tubular second motor housing that opposes one axial side of the first motor housing, is open to another axial side, and accommodates at least a portion of the rotation detector. The first motor housing includes a first penetration portion that radially penetrates a circumferential wall portion of the first motor housing and is open to one axial side. The second motor housing includes a second penetration portion that radially penetrates a circumferential wall portion of the second motor housing and is open to another axial side. The first wiring is lead to an outside of the first motor housing via the first penetration portion, and the second wiring is lead to an outside of the second motor housing via the second penetration portion.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described in detail below with reference to the accompanying drawings.

Figure 1:
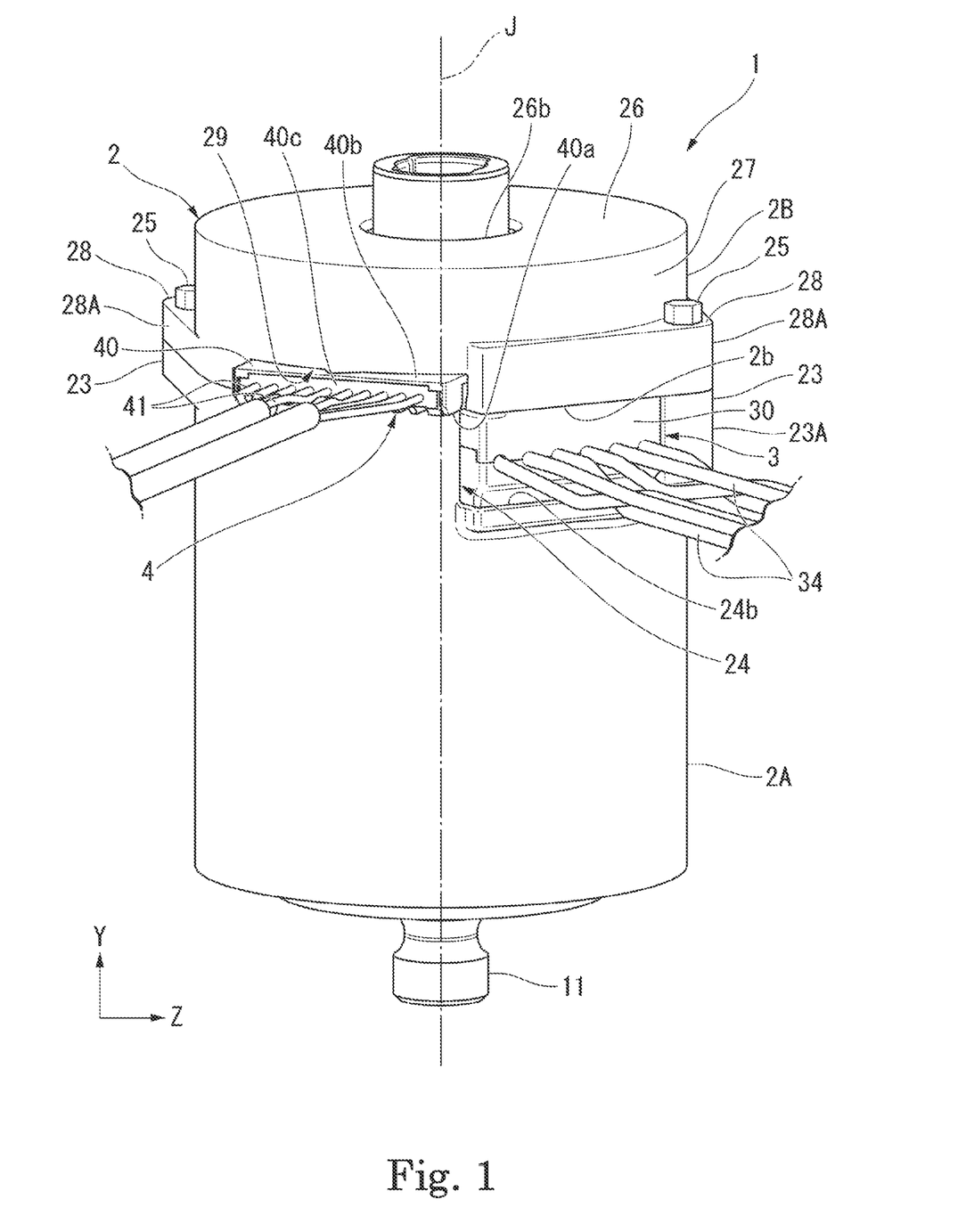
FIG. 1 is a perspective view of a motor of an example embodiment of the present disclosure.
Figure 2:
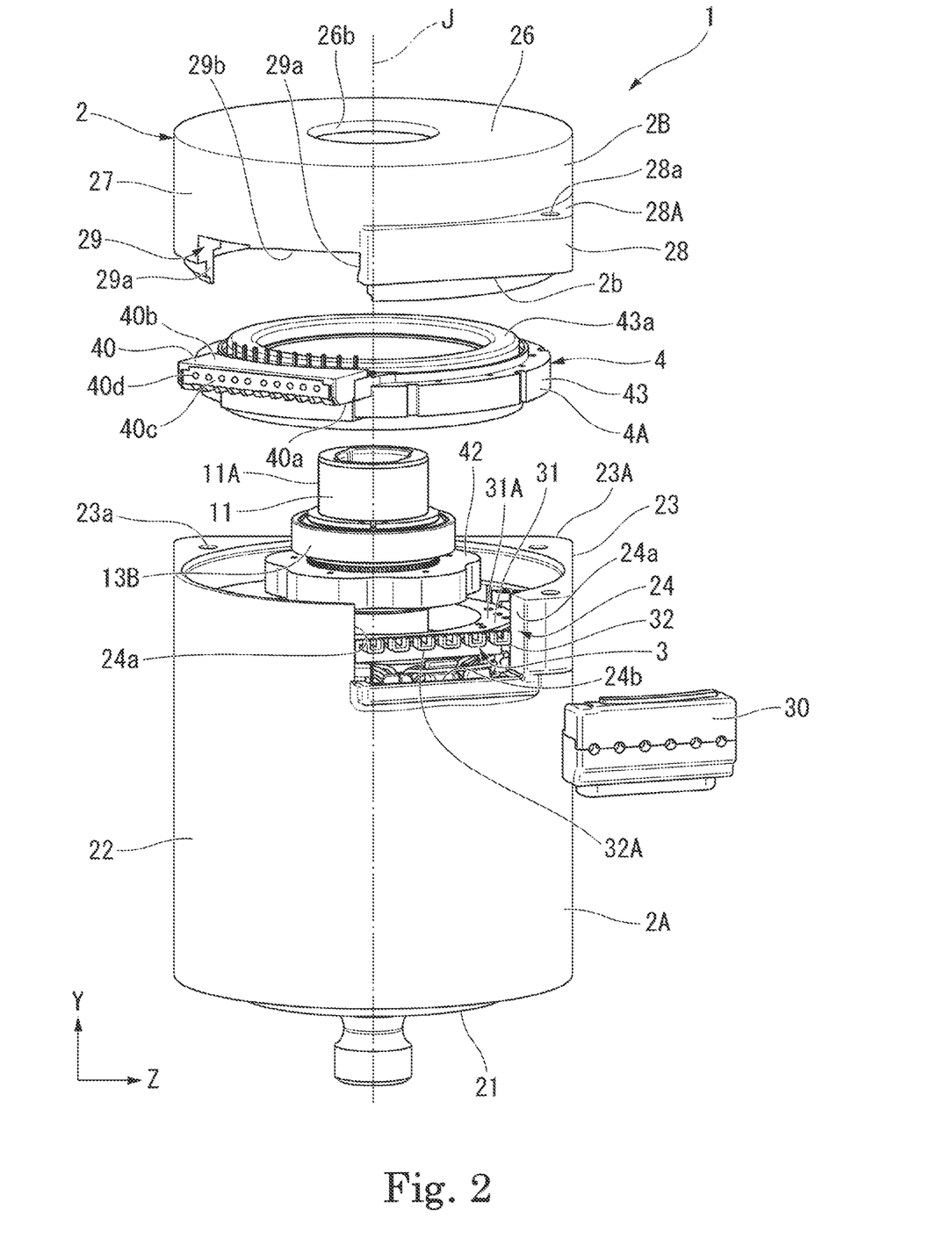
FIG. 2 is an exploded perspective view of a motor of an example embodiment of the present disclosure.
Figure 3:
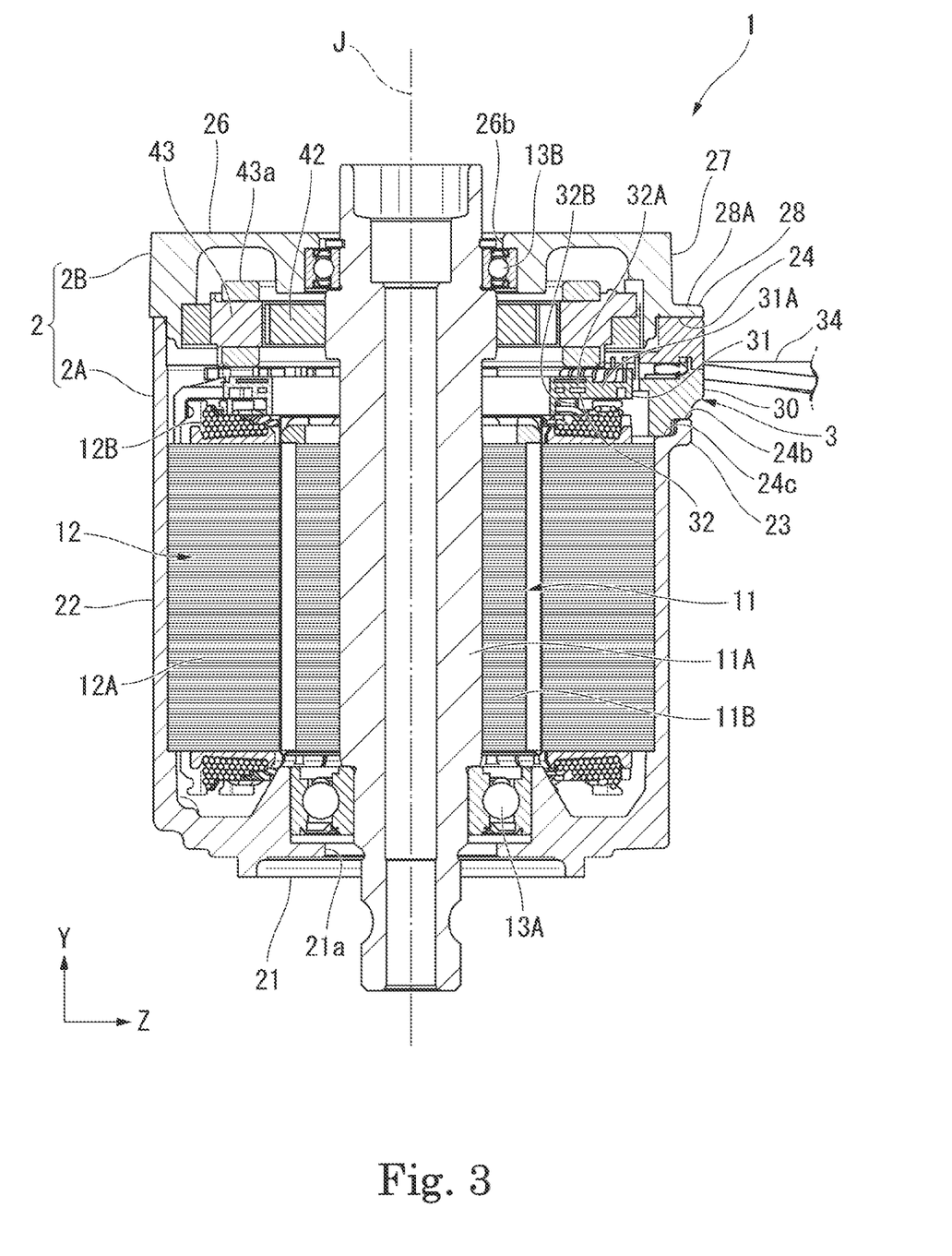
FIG. 3 is a longitudinal sectional view of a motor of an example embodiment of the present disclosure.

A motor 1 of the present example embodiment illustrated in FIGS. 1 to 3 is mounted on, for example, a vehicle.

In the present example embodiment, a center axis J of the motor 1 extends in the vertical direction. The direction in which the center axis J extends is, for example, the vertical direction Y of a vehicle on which the motor 1 is mounted. In description below, unless otherwise particularly stated, a direction parallel to the center axis J is simply referred to as the "axial direction", a radial direction about the center axis J is simply referred to as the "radial direction", and a circumferential direction about the center axis J, that is, a direction around the center axis J is simply referred to as the "circumferential direction". Further, in the drawings, as appropriate, the axial direction is indicated by a Y axis, the side to which an arrow is directed in the Y axis is referred to as the "upper side", and the side opposite to the side to which the arrow is directed in the Y axis is referred to as the "lower side". In the present example embodiment, the lower side corresponds to an "one axial side", while the upper side corresponds to an "axial other side".

Further, in the drawings, as appropriate, the horizontal direction orthogonal to the axial direction is indicated by a Z axis, the side to which an arrow is directed in the Z axis is referred to as the "right side", and the side opposite to the side to which the arrow is directed in the Z axis is referred to as the "left side". Note that the term "parallel direction" also includes a substantially parallel direction, and the term "orthogonal direction" also includes a substantially orthogonal direction.

The motor 1 includes a rotor 11 rotatable about a center axis J, a stator 12 having a plurality of coils 12B and facing the rotor 11 in a radial direction, a drive source assembly 3 having first wiring 34 electrically connected to the coils 12B, a rotation detector 4 having a rotation sensor 4A capable of detecting rotation of the rotor 11 and second wiring 41 electrically connected to the rotation sensor 4A, and a motor housing 2 accommodating the rotor 11, the stator 12, the drive source assembly 3, and the rotation detector 4 therein.

As illustrated in FIG. 3, the rotor 11 rotates about the center axis J extending along the vertical direction Y. The rotor 11 includes a shaft 11A rotatable about the center axis J, and a rotor body 11B fixed to an outer circumferential face of the shaft 11A. The rotor body 11B includes, for example, a rotor core and a magnet.

The shaft 11A is rotatably supported about the center axis J by a first bearing 13A and a second bearing 13B. The rotor core of the rotor body 11B is fixed to the outer circumferential face of the shaft 11A. The shaft 11A is a cylindrical hollow shaft extending in the axial direction about the center axis J. The shaft 11A extends inside the motor housing 2.

The stator 12 is located radially outside of the rotor 11. The stator 12 includes an annular stator core 12A surrounding the rotor body 11B and a plurality of coils 12B attached to the stator core 12A. The stator core 12A has, for example, a cylindrical shape about the center axis J. The coil 12B is attached to the stator core 12A with, for example, an insulator (not illustrated) interposed between them. The end of the coil 12B is lead out above the stator 12 and connected to a bus bar 32 of the drive source assembly 3.

The first bearing 13A and the second bearing 13B rotatably support the shaft 11A about the center axis J. The first bearing 13A rotatably supports a portion of the shaft 11A, the portion being located below a portion to which the rotor body 11B is fixed. The second bearing 13B rotatably supports a portion of the shaft 11A, the portion being located above a portion to which the rotor body 11B is fixed. The first bearing 13A and the second bearing 13B are, for example, ball bearings.

The motor housing 2 accommodates the rotor 11 and the stator 12 in the inside.

As illustrated in FIGS. 2 and 3, the motor housing 2 includes a first motor housing 2A and a second motor housing 2B. The first motor housing 2A is open upward and has a tubular shape that accommodates at least part of the drive source assembly 3. The second motor housing 2B is disposed to face the upper side of the first motor housing 2A, is opened to downward, and has a tubular shape that accommodates at least part of the rotation detector 4. The first motor housing 2A and the second motor housing 2B are, for example, single members different from each other. The first motor housing 2A and the second motor housing 2B are formed by, for example, die casting.

The first motor housing 2A includes a bottom portion 21, a cylindrical portion 22, and a first flange portion 23. The bottom portion 21 is located below the stator 12. The bottom portion 21 has a circular shape about the center axis J when viewed in the axial direction, for example. The bottom portion 21 has a hole portion 21a penetrating in the axial direction. The first bearing 13A is fitted into the hole portion 21a. In this manner, the bottom portion 21 holds the first bearing 13A. The shaft 11A passes through the hole portion 21a.

The cylindrical portion 22 is located radially outside the stator 12. The cylindrical portion 22 extends upward from, for example, a radially outer circumferential edge portion of the bottom portion 21. The cylindrical portion 22 has a cylindrical shape about the center axis J. The cylindrical portion 22 is open upward. The stator core 12A is fixed to the cylindrical portion 22. The outer circumferential face of the stator core 12A is in contact with the inner circumferential face of the cylindrical portion 22.

The cylindrical portion 22 has a first penetration portion 24 that radially penetrates the cylindrical portion 22 on the opening side. The first penetration portion 24 is open upward. The first penetration portion 24 is an opening connecting the inside of the first motor housing 2A and the outside of the motor 1. The first wiring 34 connected to the bus bar 32 passes through the first penetration portion 24.

Figure 4:
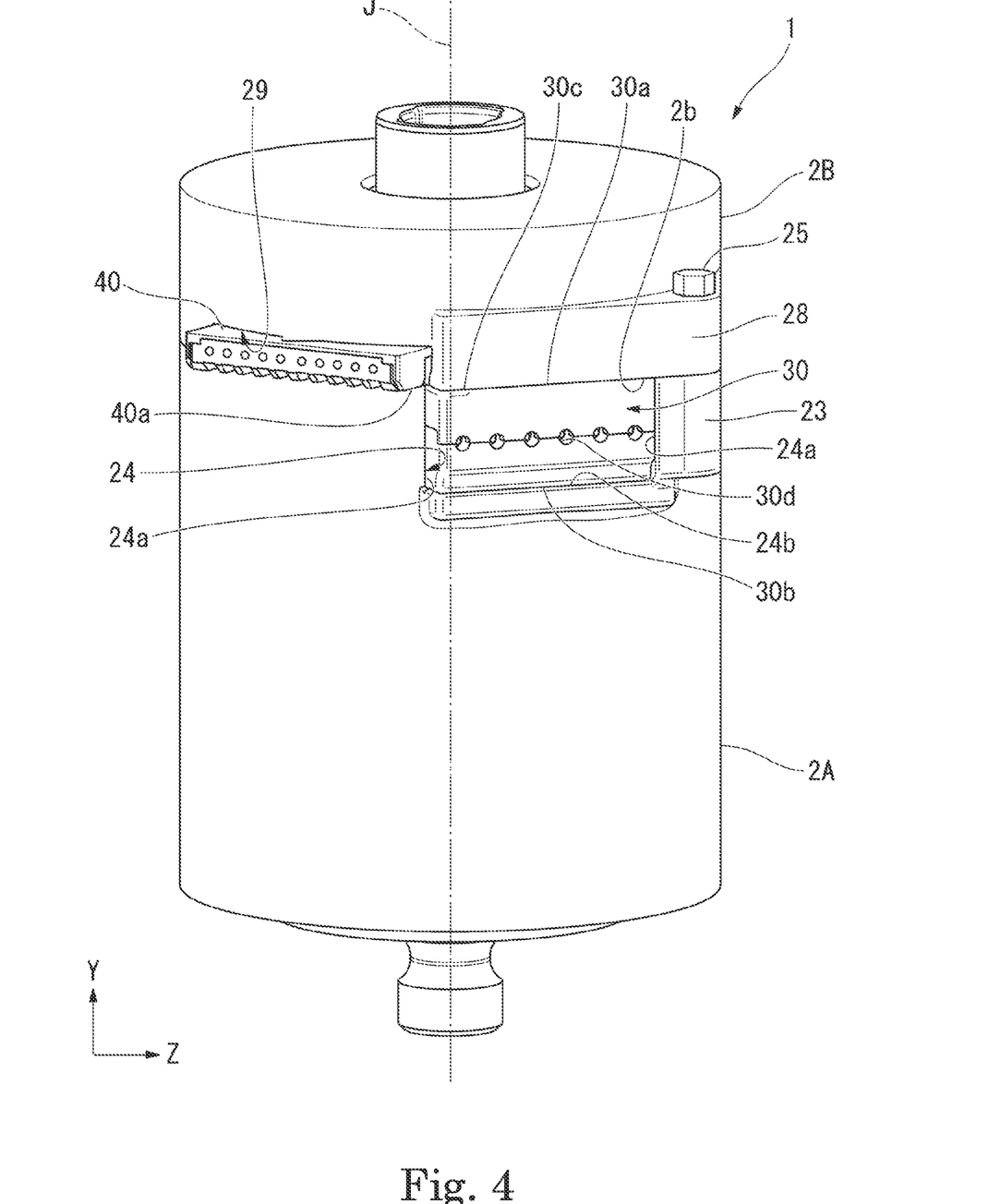
FIG. 4 is a perspective view illustrating a portion of a motor of an example embodiment of the present disclosure.
Figure 5:
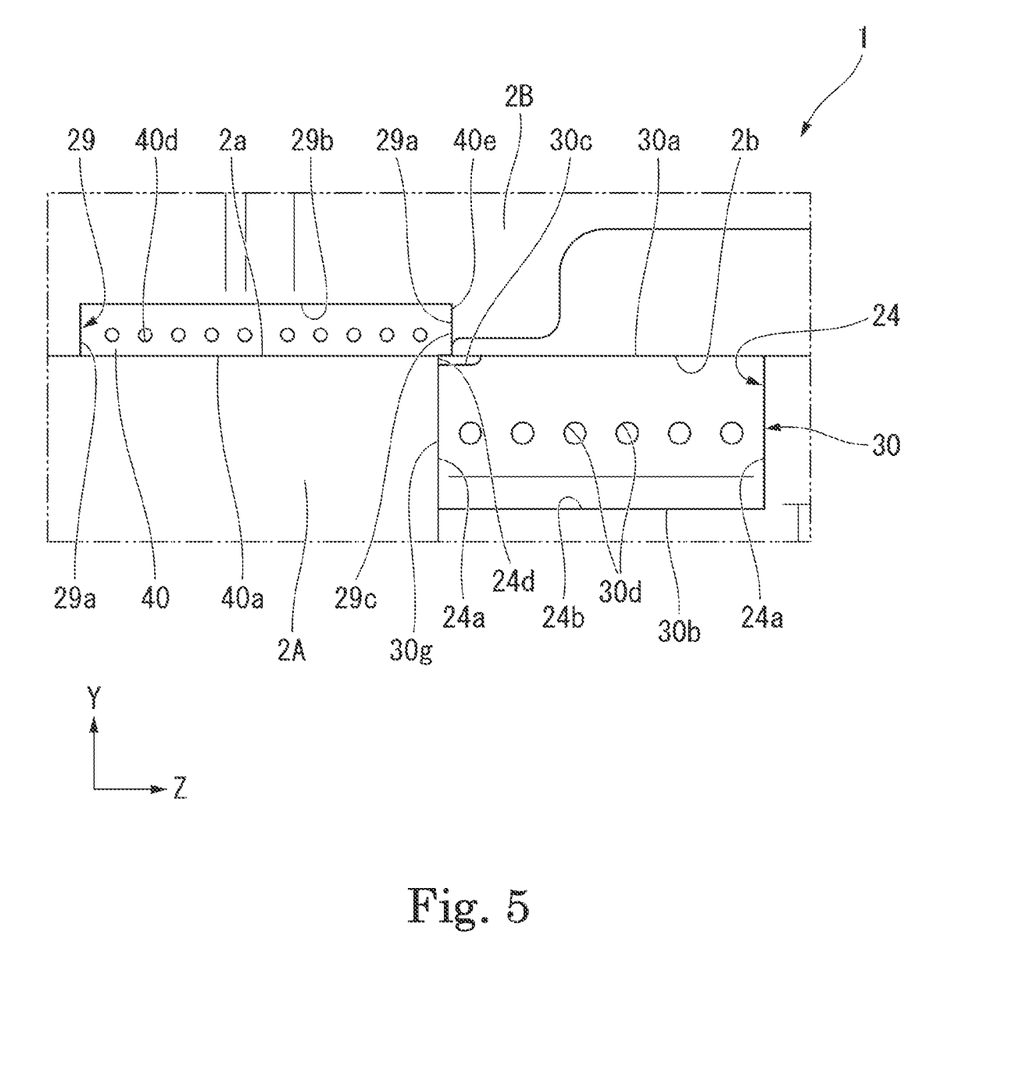
FIG. 5 is a side view of a first wiring support and a second wiring support of an example embodiment of the present disclosure.
Figure 6:
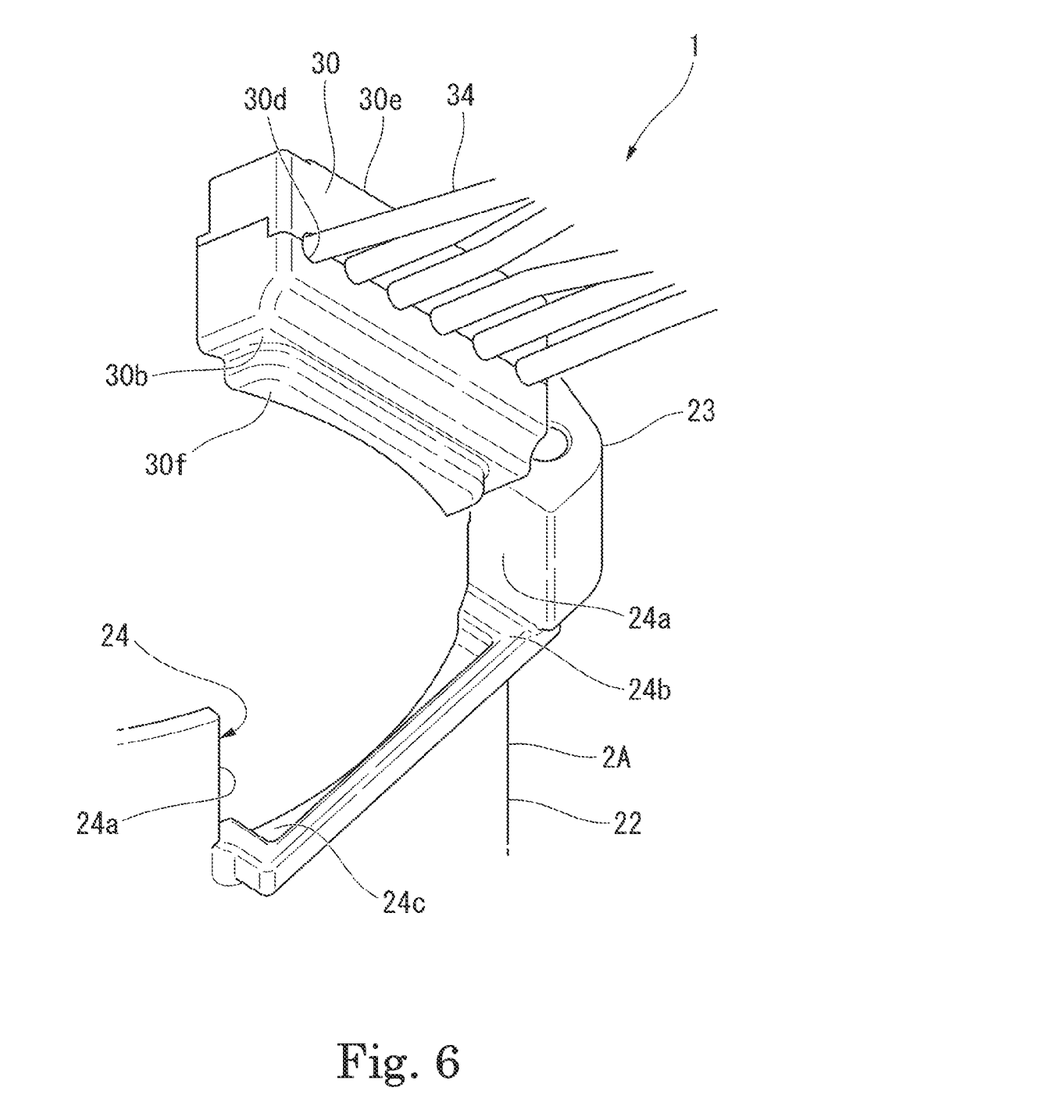
FIG. 6 is a perspective view illustrating a portion of a first wiring support of an example embodiment of the present disclosure.

The first penetration portion 24 is positioned to axially face the lead-out portion of the first wiring 34. A first wiring support 30 described later is fitted into the first penetration portion 24. As illustrated in FIGS. 2, 4, and 5, the first penetration portion 24 has a pair of side faces 24a extending in the vertical direction Y and facing each other in the circumferential direction, and an upper surface 24b connecting lower ends of the pair of side faces 24a. The upper surface 24b protrudes radially outward from the outer circumferential face of the cylindrical portion 22. As illustrated in FIG. 6, the upper surface 24b has a recessed portion 24c in which a radially inner portion is recessed downward relative to a radially outer portion. A downward protrusion 30f of the first wiring support 30 is fitted into the recessed portion 24c. As illustrated in FIGS. 2 and 3, the first penetration portion 24 is provided at a position at substantially the same height, in the vertical direction Y, as the bus bar holder 31 described later.

Figure 7:
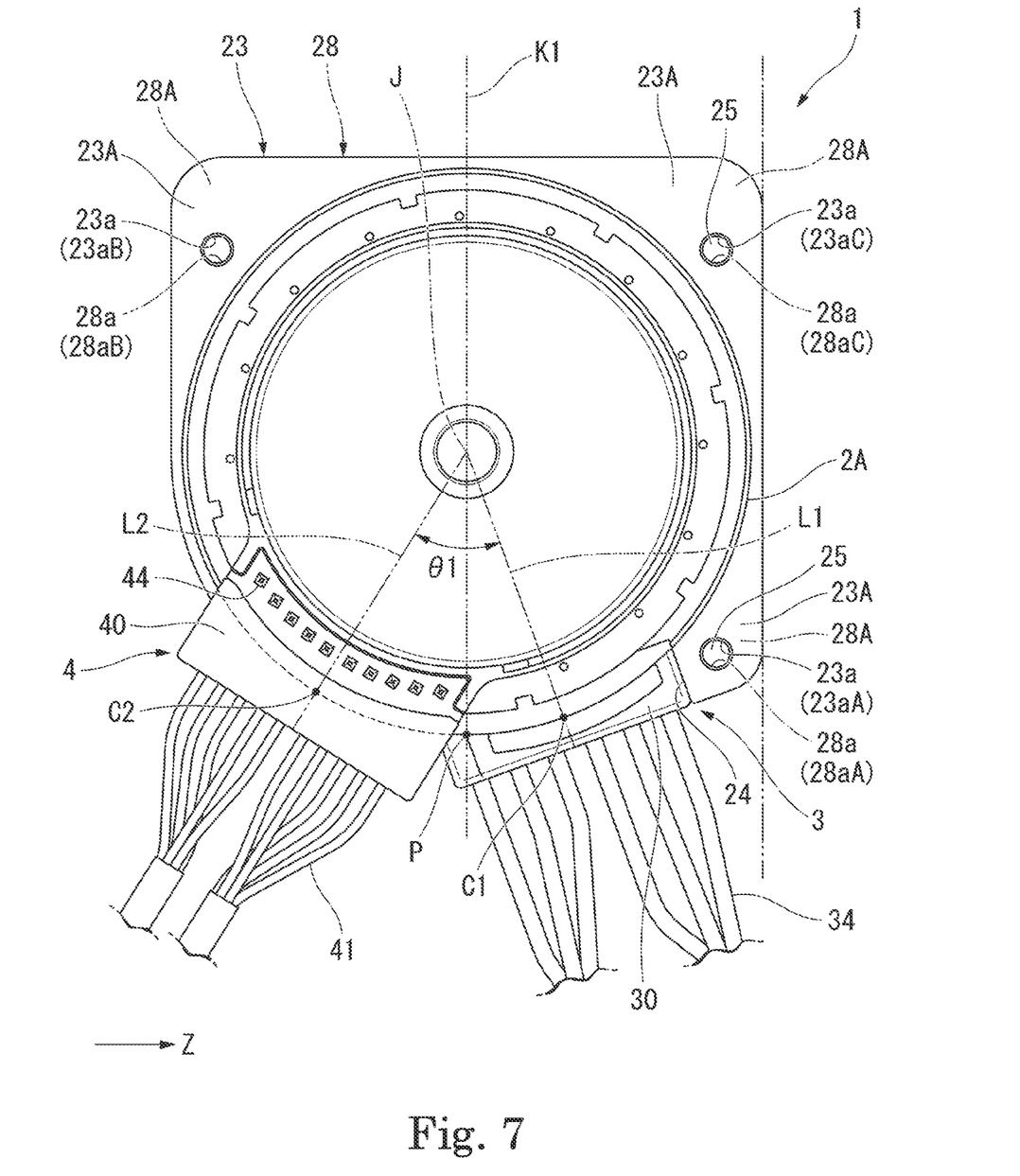
FIG. 7 is a cross-sectional view orthogonal to a center axis of a first motor housing of an example embodiment of the present disclosure.

As illustrated in FIG. 7, the first flange portion 23 extends radially outward from the upper opening end of the cylindrical portion 22 and protrudes. The first flange portion 23 has a plurality of (three in the present example embodiment) enlarged diameter portions 23A at predetermined intervals in the circumferential direction. One of the three enlarged diameter portions 23 extends in a direction not only which is parallel to an imaginary line K1 connecting a portion where the first wiring support 30 and the second wiring support 40 intersect with the center axis J of the rotor 11 but also in which the first wiring support 30 and the second wiring support 40 are disposed when viewed from the axial direction. In the present example embodiment, the portion where the first wiring support 30 and the second wiring support 40 intersect when viewed from the axial direction is set as an intersection point P, for example.

As illustrated in FIG. 1, a second flange portion 28, which will be described later, of the second motor housing 2B is joined to the upper surface of the first flange portion 23 from above. As illustrated in FIG. 7, the first flange portion 23 has three enlarged diameter portions 23A spaced apart in the circumferential direction. The enlarged diameter portion 23A has a first through hole 23a penetrating in the axial direction. The first through hole 23a has an inner face provided with a female screw. The first motor housing 2A and the second motor housing 2B are fixed by fastening the fixing portion 25 into the first through hole 23a.

As illustrated in FIG. 7, one (first through hole 23aA) of the plurality of first through holes 23a is disposed at a position adjacent to the right side of the first penetration portion 24 (away from the second penetration portion 29 side of the second motor housing 2B to be described later) in the circumferential direction. The other two through holes 23a (first through holes 23aB and 23aC) are located opposite to the first wiring support 30 and the second wiring support 40 with the center axis J of the rotor 11 interposed therebetween.

As illustrated in FIGS. 2 and 3, the second motor housing 2B is independent from the first motor housing 2A. The second motor housing 2B is fixed to the upper end of the first motor housing 2A. The second motor housing 2B includes a top wall portion 26, a circumferential wall portion 27, and a second flange portion 28. The top wall portion 26 is located above the rotor 11 and the stator 12. The top wall portion 26 covers the entire rotor 11 and the stator 12 except for part of the shaft 11A from above.

The top wall portion 26 has a circular shape about the center axis J when viewed in the axial direction, for example. As illustrated in FIG. 3, the second bearing 13B is disposed radially inside on the lower surface of the top wall portion 26. As a result, the second motor housing 2B holds the second bearing 13B. The top wall portion 26 covers the outer ring of the second bearing 13B. A central hole 26b penetrating in the axial direction is provided in the top wall portion 26. The shaft 11A passes through the central hole 26b.

The circumferential wall portion 27 has, for example, a cylindrical shape extending downward from a radially outer circumferential edge portion of the top wall portion 26. The circumferential wall portion 27 has a second penetration portion 29 penetrating in the radial direction. As illustrated in FIGS. 4 and 5, the second penetration portion 29 is open downward. The second penetration portion 29 is an opening connecting the inside of the second motor housing 2B and the outside of the motor 1. As illustrated in FIGS. 1 and 7, the second wiring 41 that transmits an electrical signal for detecting the rotational position of the rotor 11 passes through the second penetration portion 29.

The second penetration portion 29 is positioned to axially face the lead-out portion of the second wiring 41. The second wiring support 40 to be described later is fitted into the second penetration portion 29. As illustrated in FIGS. 2 and 5, the second penetration portion 29 has a pair of side faces 29a extending in the vertical direction Y and facing each other in the circumferential direction, and a lower surface 29b connecting upper ends of the pair of side faces 29a. The second penetration portion 29 is provided at a position at substantially the same height, in the vertical direction Y, as a resolver stator 43 of the rotation detector 4 described later. As illustrated in FIG. 5, the second penetration portion 29 partially overlaps with the first penetration portion 24 in the circumferential direction when viewed from the axial direction. The side face 29a of the second penetration portion 29 is located right of the side face 24a of the first penetration portion 24.

The second flange portion 28 extends radially outward and protrudes from the lower opening end of the circumferential wall portion 27. The second flange portion 28 has a plurality of (three in the present example embodiment) enlarged diameter portions 28A at predetermined intervals in the circumferential direction at positions overlapping with the first flange portion 23 in the vertical direction Y. The second flange portion 28, the enlarged diameter portion 28A, and a second through hole 28a to be described later illustrated in FIG. 7 are provided at the same position and shape as the first flange portion 23, the enlarged diameter portion 23A, and the first through hole 23a, respectively, when viewed in the axial direction, and are indicated by imaginary lines.

The first flange portion 23 of the first motor housing 2A is joined to the lower surface of the second flange portion 28 from below. The second flange portion 28 has three enlarged diameter portions 28A at intervals in the circumferential direction. The enlarged diameter portion 28A has the second through hole 28a penetrating in the axial direction. The second through hole 28a has an inner face provided with a female screw. The second flange portion 28 is fixed to the first flange portion 23 by the fixing portion 25 that connects the first motor housing 2A and the second motor housing 2B. The fixing portion 25 is fastened to the second through hole 28a in a state where the second through hole is aligned coaxially with the first through hole 23a of the first flange portion 23.

One (second through hole 28aA) of the plurality of second through holes 28a is disposed at a position adjacent to the right side of the second penetration portion 29 (the right side of the first penetration portion 24 of the first motor housing 2A) in the circumferential direction. The other two second through holes 28a (second through holes 28aB, 28aC) are located away from the first wiring support 30 and the second wiring support 40 with the center axis J of the rotor 11 interposed therebetween.

Figure 8:
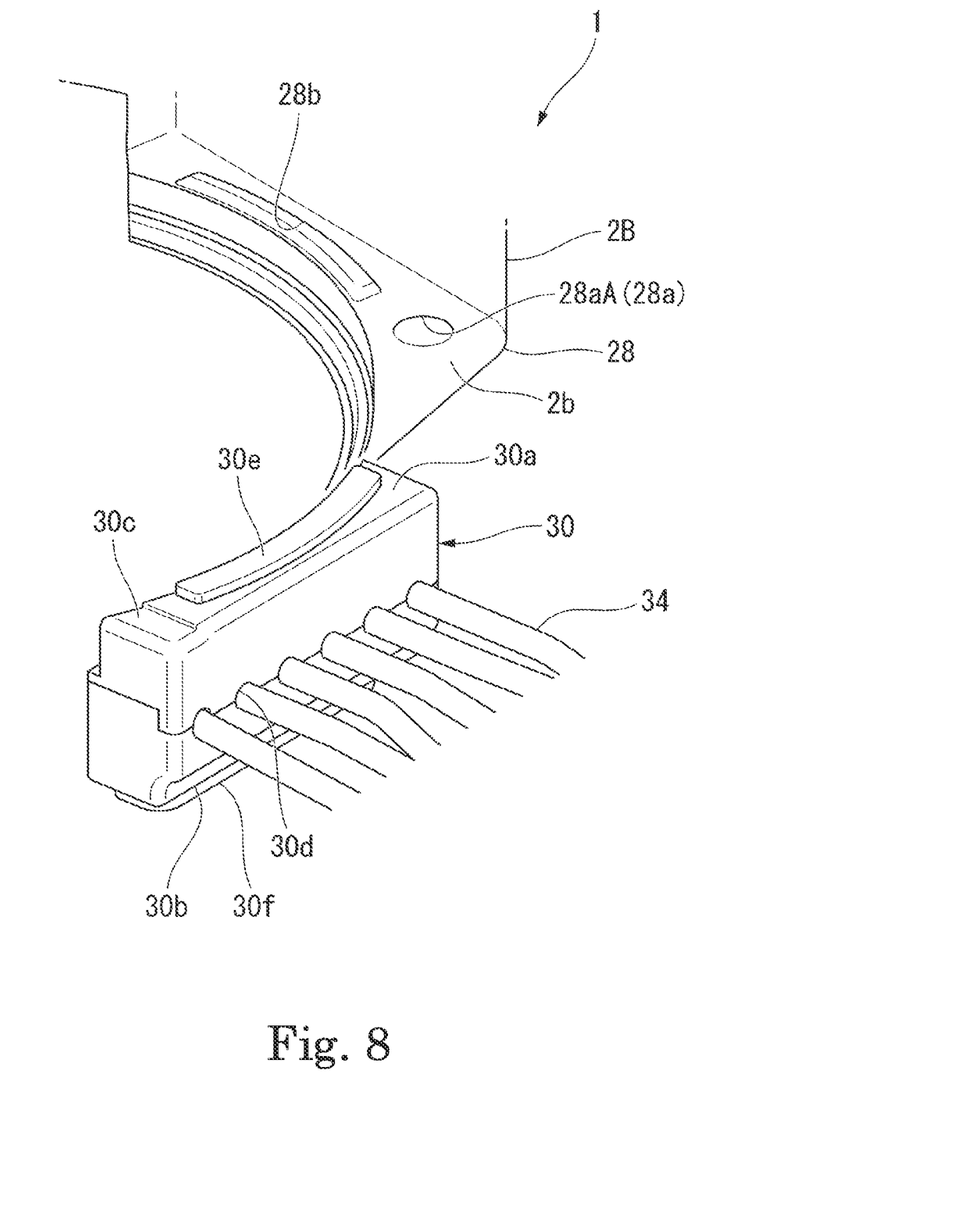
FIG. 8 is a perspective view illustrating a portion of a first wiring support of an example embodiment of the present disclosure.

As illustrated in FIG. 8, the lower surface of the second flange portion 28 at the portion where the second through hole 28aA adjacent to the first wiring support 30 is disposed has a recessed groove 28b extending in the circumferential direction. An upward protrusion 30e of the first wiring support 30 is fitted into the recessed groove 28b.

In the present example embodiment, the first motor housing 2A and the second motor housing 2B are fixed to each other by coaxially positioning the first through hole 23a provided in the first flange portion 23 and the second through hole 28a provided in the second flange portion 28 and fastening the fixing portions 25 into the through holes 23a and 28a.

As illustrated in FIG. 3, the drive source assembly 3 is located above the stator 12. The drive source assembly 3 includes a terminal 32B connected to a control device (not illustrated) via the first wiring 34, and a connecting portion (not illustrated) connected to an end of the coil 12B. The drive source assembly 3 supplies the AC current supplied from the control device to each coil 12B. The drive source assembly 3 includes the elastically deformable first wiring support 30 that holds the first wiring 34. The first wiring 34 is lead out to the outside of the first motor housing 2A through the first penetration portion 24.

As illustrated in FIGS. 2 and 3, the drive source assembly 3 includes a bus bar holder 31 made of resin and a plurality of bus bars 32 embedded in the bus bar holder 31. The plurality of bus bars 32 is embedded in the bus bar holder 31 by insert molding. The bus bar holder 31 is made of an insulation resin material.

The bus bar holder 31 is a resin member that holds the bus bar 32. The bus bar holder 31 is attached above the stator 12. The bus bar holder 31 is accommodated in the first motor housing 2A.

The bus bar 32 is electrically connected to the stator 12 inside the first motor housing 2A. The bus bar 32 is made of a metal material (for example, a copper-based alloy) having high conductivity. The bus bar 32 has a plate shape. The bus bar 32 is formed by pressing a plate material.

As illustrated in FIGS. 1 and 2, the first wiring support 30 is fitted into the first penetration portion 24. The first wiring support 30 is supported between the upper surface 24b (bottom portion) of the first penetration portion 24 and a lower end face 2b of the second motor housing 2B. As a material of the first wiring support 30, for example, an elastically deformable material such as rubber or foamed resin is used.

The first wiring support 30 is provided with a plurality of insertion holes 30d through which the first wiring 34 is inserted in a direction orthogonal to the axial direction. The plurality of insertion holes 30d is provided at intervals in the circumferential direction. The plurality of insertion holes 30d is disposed at substantially the center of the first wiring support in the vertical direction Y. The inner diameter of the insertion hole 30d is equal to or slightly smaller than the outer diameter of the first wiring 34. The first wiring support 30 is divided into two at a substantially central position in the vertical direction Y. The division position of the first wiring support 30 is a position where the insertion hole 30d is also divided in the vertical direction Y.

The first wiring support 30 has an upper surface 30a axially facing the second motor housing 2B. The upper surface 30a is fitted to the lower end face 2b of the second motor housing 2B. As illustrated in FIG. 8, the upper surface 30a has the upward protrusion 30e that protrudes to the one axial side and extends in the circumferential direction. The lower end face 2b of the second motor housing 2B has a recessed groove 28b recessed toward the one axial side and extending in the circumferential direction. The upward protrusion 30e is fitted into the recessed groove 28b of the second motor housing 2B. As illustrated in FIG. 6, the first wiring support 30 has the upper surface 24b of the first penetration portion 24 of the first motor housing 2A and a lower surface 30b axially facing the upper surface 24b. The upper surface 24b has the recessed portion 24c that is recessed to the axial other side and extends in the circumferential direction. The lower surface 30b has the downward protrusion 30f protruding to the axial other side and extending in the circumferential direction. The downward protrusion 30f is fitted into the recessed portion 24c on the upper surface 24b of the first penetration portion 24.

As illustrated in FIG. 5, the first wiring support 30 partially overlaps with the second wiring support 40 in the circumferential direction when viewed from the axial direction. That is, a left end portion 30g of the first wiring support 30 is located left of a right end portion 40e of the second wiring support 40 in the circumferential direction.

As illustrated in FIGS. 4 and 8, the first wiring support 30 is provided with a stepped portion 30c recessed in the axial direction at a portion axially facing the second wiring support 40. The stepped portion 30c is located at the left end portion of the upper surface 30a of the first wiring support 30. As illustrated in FIG. 5, the stepped portion 30c is recessed axially downward relative to an opening edge 24d of the first penetration portion 24 in the axial direction. The opening edge 24d of the first penetration portion 24 is located at an upper end face 2a of the first motor housing 2A. In a state where the first wiring support 30 is disposed in the first penetration portion 24 and the second motor housing 2B is not attached, the upper surface 30a of the first wiring support 30 is located above the upper end face 2a of the first motor housing 2A. When the second motor housing 2B is attached, the first wiring support 30 is crushed downward by the lower end face 2b of the second motor housing 2B, and the position of the upper surface 30a is the same as that of the upper end face 2a of the first motor housing 2A. The stepped portion 30c is located below the upper end face 2a of the first motor housing 2A in a state of being crushed in the vertical direction.

As illustrated in FIGS. 2 and 3, the rotation detector 4 can detect the rotation of the rotor 11. The rotation detector 4 is located, for example, above the drive source assembly 3 inside the second motor housing 2B. The rotation sensor 4A of the rotation detector 4 is a resolver in the present example embodiment. The rotation sensor 4A includes a resolver rotor 42 and the resolver stator 43. The resolver rotor 42 is fixed to an outer circumferential face of the shaft 11A. The resolver stator 43 is located radially outside the resolver rotor 42. The resolver stator 43 has an annular shape surrounding the resolver rotor 42. For example, the resolver stator 43 is fixed to a lower surface of the top wall portion 26 of the second motor housing 2B. The rotation detector 4 includes the second wiring support 40 including a plurality of terminals (not illustrated). The second wiring 41 is connected to each of the plurality of terminals.

The resolver stator 43 includes a coil 43a. When the resolver rotor 42 rotates together with the shaft 11A, an induced voltage corresponding to a circumferential position of the resolver rotor 42 is generated in the coil of the resolver stator 43. The rotation detector 4 can detect the rotation of the resolver rotor 42 and the shaft 11A based on a change in the induced voltage generated in the coil of the resolver stator 43. In this manner, the rotation detector 4 can detect the rotation of the rotor 11.

The second wiring support 40 is provided on part of the rotation detector 4 in the circumferential direction of the resolver stator 43. The second wiring support 40 protrudes radially outward from the resolver stator 43. The second wiring support 40 is fitted into the second penetration portion 29 of the second motor housing 2B. As illustrated in FIG. 1, the second wiring 41 is lead out to the outside of the second motor housing 2B via the second penetration portion 29. As illustrated in FIG. 5, the second wiring support 40 is supported between the lower surface 29b of the second penetration portion 29 and the upper end face 2a of the first motor housing 2A. When viewed from the radial direction, the axial position of the lower end 40a of the second wiring support 40 substantially coincides with the axial position of the upper surface 30a of the first wiring support 30. As illustrated in FIGS. 1 and 2, in the second wiring support 40, a distal end portion 40c protrudes radially outward relative to the circumferential wall portion 27 of the second motor housing 2B in a state of being fitted to the second penetration portion 29. The second wiring support 40 is a member having higher rigidity than at least the first wiring support 30. The second wiring support 40 is made of resin, for example.

As illustrated in FIG. 2, the second wiring support 40 includes a terminal (not illustrated) that connects the plurality of second wiring 41. The terminal is electrically connected to the resolver stator 43 by the second wiring 41. The second wiring 41 is connected to a terminal of the second wiring support 40. The second wiring support 40 is provided with a plurality of insertion holes 40d through which the second wiring 41 is inserted in the direction orthogonal to the axial direction. As illustrated in FIG. 5, the plurality of insertion holes 40d is provided at intervals in the circumferential direction. The plurality of insertion holes 40d is disposed at substantially central positions in the vertical direction Y. The inner diameter of the insertion hole 40d is equal to or slightly smaller than the outer diameter of the second wiring 41.

Here, as illustrated in FIG. 7, in the first wiring support 30, a line connecting a circumferential center C1 of the first wiring support 30 and the center axis J when viewed in the axial direction is defined as a first line L1. In the second wiring support 40, a line connecting a circumferential center C2 of the second wiring support 40 and the center axis J when viewed in the axial direction is defined as a second line L2. An angle θ1 formed by the first line L1 and the second line L2 is, for example, approximately 50 degrees. The angle θ1 is preferably 50 degrees to 70 degrees.

In the present example embodiment, the tubular first motor housing 2A that is open upward and accommodates at least part of the drive source assembly 3, and the tubular second motor housing 2B that is disposed to face the upper side of the first motor housing 2A, is open downward, and accommodates at least part of the rotation detector 4 are included. The first motor housing 2A has the first penetration portion 24 that radially penetrates the cylindrical portion 22 of the first motor housing 2A and is open upward. The second motor housing 2B has the second penetration portion 29 that radially penetrates the circumferential wall portion 27 of the second motor housing 2B and is open downward. Therefore, the first wiring 34 can be lead out to the outside of the first motor housing 2A via the first penetration portion 24. The second wiring 41 can be lead out to the outside of the second motor housing 2B via the second penetration portion 29. With such a configuration, the penetration portions 24 and 29 can be provided in the first motor housing 2A and the second motor housing 2B, respectively, as appropriate for the arrangement in the axial direction in the internal structure. That is, the first penetration portion 24 and the second penetration portion 29 can be provided as appropriate for the position where the first wiring 34 of the drive source assembly 3 is lead out and the position where the second wiring 41 of the rotation detector 4 is lead out, respectively. The first wiring 34 and the second wiring 41 can be lead to the outside through the penetration portions 24 and 29 with the heights as they have without changing and adjusting the heights thereof inside the motor housing 2. Therefore, the wiring accommodated in the motor housing 2 and guided to the lead-out portions (the first wiring support 30 and the second wiring support 40) and the holding structure can be simplified. In the present example embodiment, since the structure of the motor 1 is not complicated, the manufacturing cost can be reduced.

Further, according to the present example embodiment, the drive source assembly 3 includes the elastically deformable first wiring support 30 that holds the first wiring 34. The first wiring support 30 is fitted into the first penetration portion 24. As a result, the force and impact received from the second motor housing 2B can be effectively absorbed by the elastic deformation of the first wiring support 30. Therefore, the force and impact from the second motor housing 2B applied to the first wiring 34 passing through the first wiring support 30 are reduced, so that the first wiring 34 can be protected.

According to the present example embodiment, the rotation detector 4 includes the second wiring support 40 that holds the second wiring 41. The second wiring support 40 is disposed in the second penetration portion 29. Part of the first wiring support 30 and part of the second wiring support 40 axially face each other. The stepped portion 30c recessed in the axial direction is provided at a portion of the first wiring support 30 axially facing the second wiring support 40. Therefore, when the first motor housing 2A and the second motor housing 2B are combined, the first wiring support 30 is crushed in the axial direction by elastic deformation. Since the stepped portion 30c of the first wiring support 30 elastically deformed in the axial direction is located below the upper end face 2a of the first motor housing 2A, contact between the first wiring support 30 and the second wiring support 40 can be prevented. As a result, the force that the second wiring support 40 receives from the first wiring support 30 can be suppressed. Therefore, damage to the second wiring support 40 due to impact can be prevented.

According to the present example embodiment, the stepped portion 30c is recessed in the axial direction relative to the opening edge of the first penetration portion 24 in the axial direction. In such a configuration, even when the second wiring support 40 goes inside the opening edge of the first penetration portion 24, the stepped portion 30c of the first wiring support 30 can more reliably prevent the second wiring support 40 from contacting the first wiring support 30.

According to the present example embodiment, the first wiring support 30 is supported between the upper surface 24b of the first penetration portion 24 and the lower end face 2b of the second motor housing 2B. The second wiring support 40 is supported between the upper portion of the second penetration portion 29 and the upper end face 2a of the first motor housing 2A. The first wiring support 30 and the second wiring support 40 are fixed in the axial direction, and the movement of the first wiring support and the second wiring support 40 in the axial direction is suppressed. Therefore, contact between the first wiring support 30 and the second wiring support 40 can be prevented. As a result, it is possible to suppress application of a force from the first wiring support 30 to the second wiring support 40.

According to the present example embodiment, the first penetration portion 24 and the second penetration portion 29 at least partially overlap each other when viewed from the axial direction. Therefore, the first wiring support 30 fitted to the first penetration portion 24 and the second wiring support 40 fitted to the second penetration portion 29 can be collectively disposed in the circumferential direction. As a result, the arrangement region of the first wiring support 30 and the second wiring support 40 can be reduced. Therefore, the wiring lead-out structure can be simplified.

According to the present example embodiment, the first wiring support 30 and the second wiring support 40 at least partially overlap each other when viewed from the axial direction. Therefore, the first wiring support 30 and the second wiring support 40 can be more collectively disposed in the circumferential direction. As a result, the arrangement region of the first wiring support 30 and the second wiring support 40 can be further reduced. Therefore, the wiring lead-out structure can be further simplified.

According to the present example embodiment, the first motor housing 2A includes the first flange portion 23 extending radially outward from the opening edge in the axial direction. The second motor housing 2B has the second flange portion 28 extending radially outward from the opening edge in the axial direction. The first flange portion 23 has the plurality of first through holes 23a penetrating in the axial direction. The second flange portion 28 has the plurality of second through holes 28a penetrating in the axial direction. The first flange portion 23 and the second flange portion 28 have the plurality of fixing portions 25 inserted through the first through hole 23a and the second through hole 28a axially facing each other. At least one of the plurality of fixing portions 25 is adjacent to a side, of the first wiring support 30, away from the second wiring support 40 in the circumferential direction. Other fixing portions 25 are located opposite to the first wiring support 30 and the second wiring support 40 with respect to the center axis J of the rotor 11. As a result, the plurality of fixing portions 25 can be disposed uniformly close to each other in the circumferential direction of the motor 1 in a balanced manner. Therefore, the first motor housing 2A and the second motor housing 2B can be suitably fixed. In addition, the motor 1 can have stable strength against a load from the outside.

In addition, according to the present example embodiment, as illustrated in FIG. 7, the first flange portion 23 and the second flange portion 28 have the enlarged diameter portions 23A and 28A extending in the direction not only which is parallel to the imaginary line K1 connecting the portion where the first wiring support 30 and the second wiring support 40 intersect and the center axis J of the rotor 11 when viewed in the axial direction but also in which the first wiring support 30 and the second wiring support 40 are disposed. The fixing portion 25 is disposed in the enlarged diameter portions 23A and 28A. In such a configuration, when viewed in the axial direction, the first flange portion 23 and the second flange portion 28 do not largely protrude outward relative to the tangent line of the first motor housing 2A and the second motor housing 2B in the direction parallel to the imaginary line K1. Therefore, it is possible to suppress an increase in size of the motor 1 in the radial direction. Furthermore, the fixing structure between the first motor housing 2A and the second motor housing 2B can be made uniform in the circumferential direction.

According to the present example embodiment, the angle θ formed by the first line L1 connecting the circumferential center C1 of the first wiring support 30 and the center axis J and the second line L2 connecting the circumferential center C2 of the second wiring support 40 and the center axis J is set to 50 degrees to 70 degrees. When the angle θ is too small and the area in which the first wiring support 30 and the second wiring support 40 overlap in the axial direction is too large, a force applied from the elastically deformable first wiring support 30 to the second wiring support 40 is likely to be generated, and the second wiring support 40 may incline. Therefore, by setting the angle θ to 50 degrees or more, it is possible to suppress an increase in the area where the first wiring support 30 and the second wiring support 40 overlap each other in the circumferential direction, and it is possible to suppress generation of a force applied from the first wiring support 30 to the second wiring support 40. Therefore, the occurrence of the inclination of the second wiring support 40 can be suppressed. In addition, when the angle θ exceeds 70 degrees, the first wiring support 30 and the second wiring support 40 do not overlap and are away too much in the circumferential direction, and the motor 1 is made to be large in size in the radial direction. Therefore, by setting the angle θ to 50 degrees to 70 degrees, the first wiring support 30 and the second wiring support 40 can be suitably disposed in terms of structure and manufacturing cost.

According to the present example embodiment, the first wiring support 30 has the upper surface 30a axially facing the second motor housing 2B. The upper surface 30a has the upward protrusion 30e that protrudes to the one axial side and extends in the circumferential direction. The lower end face 2b of the second motor housing 2B has a recessed groove 28b recessed toward the one axial side and extending in the circumferential direction. The upward protrusion 30e and the recessed groove 28b are fitted to each other. In such a configuration, the fitting strength of the first wiring support 30 with respect to the first penetration portion 24 can be increased. Therefore, even when a tensile force acts on the first wiring 34, the first wiring support 30 can be prevented from slipping out of the first penetration portion 24 and falling off.

According to the present example embodiment, the first wiring support 30 has the lower surface 30b axially facing the first penetration portion 24. The lower surface 30b has the downward protrusion 30f protruding to the axial other side and extending in the circumferential direction. The upper surface 24b of the first penetration portion 24 has the recessed portion 24c that is recessed toward the axial other side and extends in the circumferential direction. The downward protrusion 30f and the recessed portion 24c are fitted to each other. In such a configuration, the fitting strength of the first wiring support 30 with respect to the first penetration portion 24 can be increased. Therefore, even when a tensile force acts on the first wiring 34, the first wiring support 30 can be prevented from slipping out of the first penetration portion 24 and falling off.

According to the present example embodiment, the rotation detector 4 is located above the drive source assembly 3. In this case, the second wiring 41 of the rotation detector 4 is disposed above the first wiring 34 of the drive source assembly 3, and the first penetration portion 24 and the second penetration portion 29 can have the same height in the vertical direction. Therefore, since the wiring can be pulled out from each of the penetration portions 24 and 29 as appropriate for the positions of the drive source assembly 3 and the rotation detector 4, the structure for holding the wiring and the wiring accommodated in the motor housing 2 and guided to the pull-out portion can be further simplified.

According to the present example embodiment, as illustrated in FIG. 3, the upper end of the first wiring support 30 is located above (at the one axial side) the lower end of the rotation detector 4. In such a configuration, it is possible to suppress an increase in the opening area of the first penetration portion 24 of the first motor housing 2A in the axial direction. Therefore, it is possible to suppress a decrease in rigidity of the first motor housing 2A. That is, as in the case where the upper end of the first wiring support 30 is located below the lower end of the rotation detector 4, it is possible to prevent the first penetration portion 24 from increasing in size in the axial direction and reducing the strength of the first motor housing 2A.

As described above, according to the present example embodiment, the wiring lead-out structure can be further simplified in the motor 1.

Although the example embodiments of the present disclosure have been described above, the structures described in the example embodiments and the combinations of the elements are merely examples, and therefore addition, omission, substation and other alterations may be appropriately made within the scope of the present disclosure. Also note that the present disclosure is not limited by the example embodiment.

Figure 9:
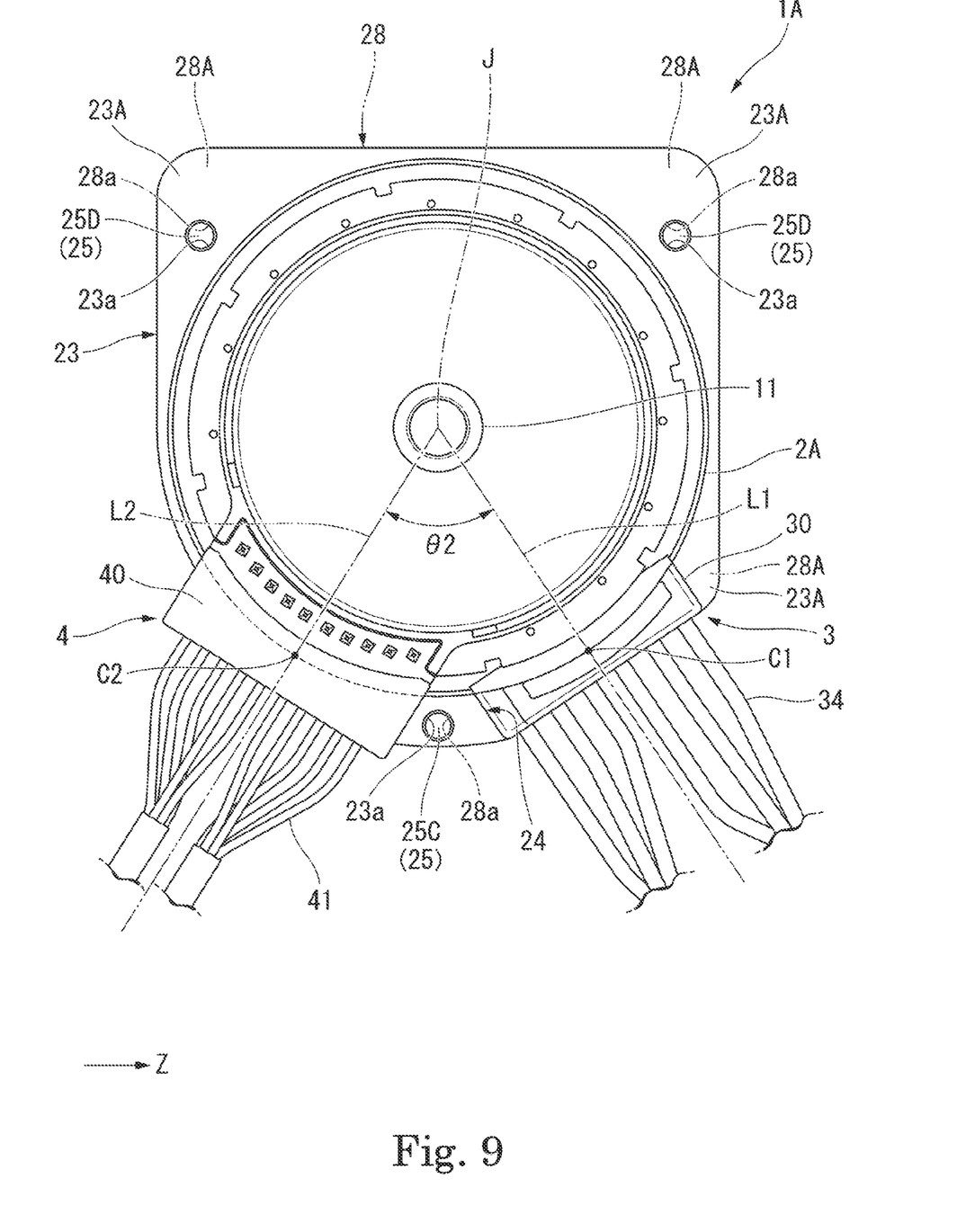
FIG. 9 is a cross-sectional view orthogonal to a center axis of a first motor housing of another example embodiment of the present disclosure.

For example, as illustrated in FIG. 9, in the motor 1A according to another example embodiment, at least one third fixing portion 25C of the plurality of fixing portions 25 is located between the first wiring support 30 and the second wiring support 40 in the circumferential direction. Other fixing portions 25D are located opposite to the first wiring support 30 and the second wiring support 40 with respect to the center axis J of the rotor 11. An angle θ2 formed by the first line L1 and the second line L2 is, for example, approximately 70 degrees. In such a configuration, the plurality of fixing portions 25 can be disposed uniformly close to each other in the circumferential direction of the motor 1 in a balanced manner. Therefore, the first motor housing 2A and the second motor housing 2B can be suitably fixed. In addition, the motor 1 can have stable strength against a load from the outside.

The fixing portion 25 may be adjacent to a side (left side), of the second wiring support 40, away from the first wiring support 30.

The application of the motor to which the present disclosure is applied is not particularly limited. The motor may be mounted on a device other than the device mounted on a vehicle. The direction in which the center axis of the motor extends is not particularly limited, and may be the vertical direction as in the present example embodiment or a direction inclined with respect to both the horizontal direction and the vertical direction. The configurations and the methods described above in the present description can be combined as appropriate within a scope in which no mutual contradiction arises.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor rotatable about a center axis;
a stator including coils and radially opposing the rotor;
a drive source assembly including a first wiring electrically connected to the coils;
a rotation detector including a rotation sensor to detect rotation of the rotor and a second wiring electrically connected to the rotation sensor; and
a motor housing that accommodates the rotor, the stator, the drive source assembly, and the rotation detector therein; wherein
the motor housing includes:
a tubular first motor housing that is open to one axial side and accommodates at least a portion of the drive source assembly; and
a tubular second motor housing that opposes one axial side of the tubular first motor housing, is open to another axial side, and accommodates at least a portion of the rotation detector;
the tubular first motor housing includes a first penetration portion that radially penetrates a circumferential wall portion of the tubular first motor housing and is open to one axial side;
the tubular second motor housing includes a second penetration portion that radially penetrates a circumferential wall portion of the tubular second motor housing and is open to another axial side;
the first wiring is lead to an outside of the tubular first motor housing via the first penetration portion; and
the second wiring is lead to an outside of the tubular second motor housing via the second penetration portion.

2. The motor according to claim 1, wherein
the drive source assembly includes an elastically deformable first wiring support that holds the first wiring; and
the first wiring support is fitted into the first penetration portion.

3. The motor according to claim 2, wherein
the rotation detector includes a second wiring support that holds the second wiring;
the second wiring support is fitted into the second penetration portion;
a portion of the first wiring support and a portion of the second wiring support axially oppose each other; and
a stepped portion recessed in the axial direction is provided in a portion of the first wiring support, the portion axially opposing the second wiring support.

4. The motor according to claim 3, wherein the stepped portion is recessed in the axial direction relative to an opening edge of the first penetration portion in the axial direction.

5. The motor according to claim 3, wherein
the first wiring support is supported between a bottom portion of the first penetration portion and a lower end surface of the tubular second motor housing; and
the second wiring support is supported between an upper portion of the second penetration portion and an upper end surface of the tubular first motor housing.

6. The motor according to claim 3, wherein the first penetration portion and the second penetration portion at least partially overlap each other when viewed from the axial direction.

7. The motor according to claim 3, wherein the first wiring support and the second wiring support at least partially overlap each other when viewed from the axial direction.

8. The motor according to claim 3, wherein
the tubular first motor housing includes a first flange portion extending radially outward from an opening edge in the axial direction;
the tubular second motor housing includes a second flange portion extending radially outward from an opening edge in the axial direction;
the first flange portion includes first through holes penetrating in the axial direction;
the second flange portion includes second through holes penetrating in the axial direction;
the motor further includes fixing portions that are inserted into the first through holes and the second through holes axially opposing each other;
at least one fixing portion of the fixing portions is, in a circumferential direction, adjacent to a side of the first wiring support, the side being spaced away from the second wiring support, or to a side of the second wiring support, the side being away spaced from the first wiring support; and
another one of the fixing portions or multiple other ones of the fixing portions are located opposite to the first wiring support and the second wiring support with respect to the center axis of the rotor.

9. The motor according to claim 8, wherein
the first flange portion and the second flange portion include enlarged diameter portions extending in a direction which is parallel to an imaginary line connecting a portion where the first wiring support and the second wiring support intersect and the center axis of the rotor when viewed from the axial direction and which the first wiring support and the second wiring support are provided; and
the fixing portions are in the enlarged diameter portions.

10. The motor according to claim 3, wherein
the tubular first motor housing includes a first flange portion extending radially outward from an opening edge in the axial direction;
the tubular second motor housing includes a second flange portion extending radially outward from an opening edge in the axial direction;
the first flange portion includes first through holes penetrating in the axial direction;
the second flange portion includes second through holes penetrating in the axial direction;
the motor further includes fixing portions that are inserted in the first through hole and the second through hole axially opposing each other;
at least one of the fixing portions is located between the first wiring support and the second wiring support in a circumferential direction; and
another fixing portion or multiple other ones of the fixing portions are located opposite to the first wiring support and the second wiring support with respect to the center axis of the rotor.

11. The motor according to claim 3, wherein an angle defined by a first line connecting a circumferential center of the first wiring support and the center axis of the rotor and by a second line connecting a circumferential center of the second wiring support and the center axis of the rotor is about 50 degrees to about 70 degrees.

12. The motor according to claim 2, wherein
the first wiring support includes an upper surface axially opposing the tubular second motor housing;
the upper surface includes an upward protrusion protruding to one axial side and extending in the circumferential direction;
a lower surface of the tubular second motor housing includes a recessed groove recessed toward one axial side and extending in the circumferential direction; and
the upward protrusion and the recessed groove are fitted to each other.

13. The motor according to claim 2, wherein
the first wiring support includes a lower surface axially opposing the first penetration portion;
the lower surface includes a downward protrusion protruding to another axial side and extending in the circumferential direction;
an upper surface of the first penetration portion includes a recessed portion recessed toward another axial side and extending in the circumferential direction; and
the downward protrusion and the recessed portion are fitted to each other.

14. The motor according to claim 13, wherein the rotation detector is located at one axial side of the drive source assembly.

15. The motor according to claim 2, wherein an upper end of the first wiring support is located at one axial side relative to a lower end of the rotation detector.

\* \* \* \* \*